United States Patent

Watanabe et al.

[11] Patent Number: 5,756,058
[45] Date of Patent: May 26, 1998

[54] PROCESS FOR PURIFYING SULFUR OXIDES-CONTAINING GAS

[75] Inventors: Teruo Watanabe, Ushiku; Hiromi Tanaka, Abiko; Kouji Kobayashi, Ichihara, all of Japan

[73] Assignee: Sumitomo Heavy Industries, Ltd., Tokyo, Japan

[21] Appl. No.: 588,300

[22] Filed: Jan. 18, 1996

Related U.S. Application Data

[63] Continuation of Ser. No. 270,678, Jul. 5, 1994, abandoned.

[30] Foreign Application Priority Data

Nov. 16, 1993 [JP] Japan .................. 5-286845

[51] Int. Cl.$^6$ .................................................. C01C 3/00
[52] U.S. Cl. ................. 423/238; 423/237; 423/241; 95/187; 95/199; 95/233
[58] Field of Search ................. 423/243.01, 237, 423/238, 241; 95/187, 199, 233

[56] References Cited

U.S. PATENT DOCUMENTS

| | | | |
|---|---|---|---|
| 1,821,064 | 9/1931 | Skogmark | 95/199 |
| 3,957,951 | 5/1976 | Hokanson et al. | 423/242 |
| 4,583,999 | 4/1986 | Lindahl et al. | 95/199 |
| 5,041,274 | 8/1991 | Kagi, Sr. | 423/242 |

FOREIGN PATENT DOCUMENTS

| | | |
|---|---|---|
| 706737 | 6/1941 | Germany . |
| 751907 | 7/1951 | Germany . |
| 1061304 | 12/1956 | Germany . |
| 60-118223 | 6/1985 | Japan ................. 95/233 |

OTHER PUBLICATIONS

Translation of German Patent No. 706,737.

*Primary Examiner*—Michael Lewis
*Assistant Examiner*—Thomas G. Dunn, Jr.
*Attorney, Agent, or Firm*—Nikaido Marmelstein Murray & Oram, LLP

[57] ABSTRACT

Impurities such as halides and ammonia are efficiently removed from a gas containing Sox at a high concentration without any substantial addition of fresh water in a process for purifying a sulfur oxides-containing gas. The process involves passing a gas containing sulfur oxides and impurities at a high concentration successively through a first washing column and thence through a second washing column, thereby water washing the gas through the two washing columns to remove the impurities from the gas. The first washing column is operated so that the outlet temperature of the gas from the first washing column is at a temperature at which the gas can have a maximum water content or a temperature near this temperature, and the second washing column is operated such that the outlet temperature of the gas from the second washing column at least 20° C. lower than the outlet temperature of the gas from the first washing column.

10 Claims, 2 Drawing Sheets

5,756,058

PROCESS FOR PURIFYING SULFUR OXIDES-CONTAINING GAS

This application is a continuation of application Ser. No. 08/270,678 filed Jul. 5, 1994, now abandoned.

BACKGROUND OF THE INVENTION

1) Field of the Invention

The present invention relates to a process for purifying a sulfur oxides-containing gas.

2) Related Prior Art

A gas containing sulfur oxides ($SO_x$) at a high concentration is obtained by contacting a flue gas with a carbonaceous adsorbent, thereby removing sulfur oxides or sulfur oxides and nitrogen oxides from the flue gas and regenerating the sulfur oxides-adsorbed on the carbonaceous adsorbent with heating. Elemental sulfur is recovered from the gas containing $SO_x$ at a high concentration, for example, by a reduction treatment of the gas according to the Claus process. In case of a flue gas from combustion of fuel coal, the gas containing $SO_x$ at a high concentration also contains halides originating from sea water sprayed over fuel coal to prevent coal dust generation before combustion. Furthermore, when ammonia is added to a flue gas to conduct removal of nitrogen oxides therefrom, most of ammonia adsorbed on the carbonaceous adsorbent, which also works as a catalyst for removing nitrogen oxides, is decomposed to a nitrogen gas during the regeneration of the adsorbed carbonaceous adsorbent with heating, whereas undecomposed ammonia is contained in the gas containing $SO_x$ at a high concentration.

These impurities such as halides and ammonia give rise to corrosion of the Claus process apparatus or poisoning of a reducing catalyst in the reactor of the Claus process apparatus, resulting in frequent shutdown of the Claus process apparatus. It is thus necessary to remove these impurities, thereby purifying a flue gas containing $SO_x$ at a high concentration before the flue gas is passed through the Claus process apparatus.

It has been proposed to purify a gas containing $SO_x$ at a high concentration by leading the gas at a temperature of 200° C. or higher to a single washing column and cooling and washing the gas with recirculating water sprayed into the washing column at the upper part, thereby removing impurities such as halides and ammonia (JP-B-5-21008). However, the proposed process has such problems that the impurities such as halides and ammonia are gradually absorbed and accumulated in the recirculating water, lowering the washing efficiency with time, and in order to suppress the lowering of washing efficiency with time it is necessary to supply fresh water, resulting in an increase in the amount of waste water to be treated separately.

It is also known to purify a gas containing $SO_x$ at a high concentration through a series of two washing columns, where the gas at a temperature of 200° C. or higher is quenched in a quenching column, then led to a first washing column and cooled to about 50° C. with water supplied by spraying into the first washing column at the upper part; and then the gas is led to a second washing column and cooled to about 40° C. or lower with water supplied into the second washing column at the upper part, while discharging the gas containing $SO_x$ at a high concentration and freed from the impurities such as halides and ammonia from the second washing column at the top. In the conventional process for purifying a gas containing $SO_x$ at a high concentration based on the series of two washing column, cooling of the gas is carried out mainly in the first washing column and purification of the gas to remove the impurities is carried out mainly in the second washing column. That is, recirculating water can be used as water to be supplied into the first washing column directed mainly to the cooling, whereas fresh water must be used in the second washing column directed mainly to the gas purification.

In a dry process $SO_x$ removal treatment or a dry process $SO_x$—$NO_x$ removal treatment, "no water supply" (which means that the treatment is carried out without any supply of water,) is a target next to no waste water discharge" (which means that the treatment is carried out without any discharge of waste water), and the conventional process requiring fresh water is thus not satisfactory yet, even if purification of the gas can be carried out completely.

SUMMARY OF THE INVENTION

An object of the present invention is to provide a process for efficiently removing impurities such as halides and ammonia from a gas containing $SO_x$ at a high concentration without any substantial supply of fresh water.

According to the present invention, there is provided a process for purifying a sulfur oxides-containing gas, which comprises passing a gas containing sulfur oxides at a high concentration successively through a first washing column and a second washing column, thereby water washing the gas through the two washing columns to remove impurities from the gas, while setting an outlet temperature of the gas from the first washing column to a temperature at which the gas can have a maximum water content or a temperature near this temperature and setting an outlet temperature of the gas from the second washing column at least by 20° C. lower than the outlet temperature of the gas from the first washing column. The impurities include halides, ammonia, etc.

DETAILED DESCRIPTION OF THE INVENTION

According to the present process a gas containing $SO_x$ at a high concentration is fed successively to a first washing column and a second washing column and washed with water in these two washing columns to remove impurities such as halides, ammonia, etc. In this respect, the present process is based on the above-mentioned conventional process using two washing columns.

A novel point of the present process is to control temperatures of a gas containing $SO_x$ at a high concentration. That is, the present process is characterized by setting an outlet temperature of the gas from the first washing column to a temperature at which the gas can have a maximum water content or a temperature near this temperature and setting an outlet temperature of the gas from the second washing column at least by 20° C. lower than the outlet temperature of the gas from the first washing column. The characteristics of the present process will be explained in detail below.

Figure 1:
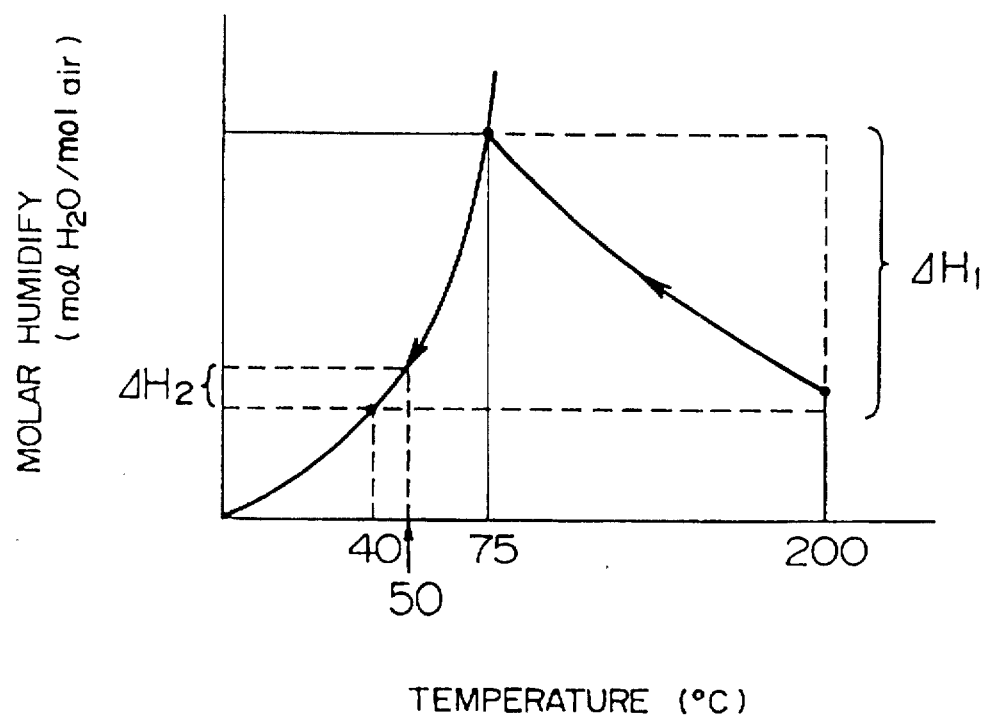
FIG. 1 is an adiabatic cooling diagram showing a gas temperature on the abscissa and a molar humidity on the ordinate.

FIG. 1 is an adiabatic cooling diagram showing a temperature of a gas containing $SO_x$ at a high concentration on the abscissa and a molar humidity on the ordinate, determined by the present inventors.

In FIG. 1, a molar humidity of a gas containing $SO_x$ at a high concentration at 200° C. is 0.424 moles $H_2O$/mole dry air, and when the gas is adiabatically cooled to lower the temperature of the gas, the molar humidity is increased, and a maximum molar humidity (0.552 moles $H_2O$/mole dry air) can be obtained at 75° C., where the gas can have a maximum water content. When the gas is further adiabatically cooled from 75° C. to a lower temperature, the molar humidity is abruptly lowered contrary to expectation. For example, the molar humidity at 40° C. is 0.018 moles $H_2O$/mole dry air. That is, by cooling the gas from 75° C. to 40° C. condensed water is formed in an amount corresponding to a difference $\Delta H_1$ between the molar humidity at 75° C. (0.552 moles $H_2O$) and the molar humidity at 40° C. (0.018 moles $H_2O$) per mole dry air, that is, $\Delta H_1 = 0.534$ moles, as shown in FIG. 1. That is, when $Q_N$ moles of the gas is adiabatically cooled, $0.534 \times Q_N$ moles of condensed water will be formed. By setting an outlet temperature of the gas from the first washing column and an outlet temperature of the gas from the second washing column to the above-mentioned conditions, as a large amount of condensed water as $0.534 \times Q_N$ moles can be formed and thus can be used as fresh water in the second washing column. That is, the washing treatment can be carried out without any substantial supply of fresh water from the outside.

When the outlet temperature of the gas is set to 50° C. in the first washing column and that from the second washing column to 40° C., as in the conventional two-column type system, on the other hand, condensed water is formed only in an amount corresponding to a difference between the molar humidity at 50° C. (0.14 moles $H_2O$) and the molar humidity at 40° C. (0.018 moles $H_2O$) per mole dry air, that is, $\Delta H_2 = 0.122$ moles. Then, when $Q_N$ moles of the gas is adiabatically cooled, only as a small amount of condensed water as $0.122 \times Q_N$ moles will be formed. Thus, it is apparent to supply fresh water to the second washing column from the outside.

The present inventors have found that when the outlet temperature of the gas from the first washing column is about 60° C., only substantially cooling of the gas is carried out in the first washing column without washing the gas, whereas when it was set to 75° C., as in the present invention, washing of the gas can be carried out in the second washing column with efficient removal of impurities such as halides and ammonia.

In the foregoing, explanation has been made, referring to the outlet temperature of the gas from the first washing column set to 75° C. and the outlet temperature of the gas from the second washing column set to 40° C. The object of the present invention can be attained by setting the outlet temperature of the gas from the first washing column to a temperature at which the gas can have a maximum water content or a temperature near this temperature and setting the outlet temperature of the gas from the second washing column at least by 20° C. lower than the outlet temperature of the gas from the first washing column.

The outlet temperature of the gas from the first washing column is preferably 65° to 90° C., more preferably 70° to 80° C., which is selected according to the humidity of a gas containing $SO_x$ at a high concentration to be fed to the first washing column, and the outlet temperature of the gas from the second washing column is preferably not higher than 50° C., more preferably not higher than 40° C. It is needless to say to select the outlet temperature of the gas from the second washing column to be at least by 20° C. lower than the outlet temperature of the gas from the first washing column.

PREFERRED EMBODIMENTS OF THE INVENTION

Figure 2:
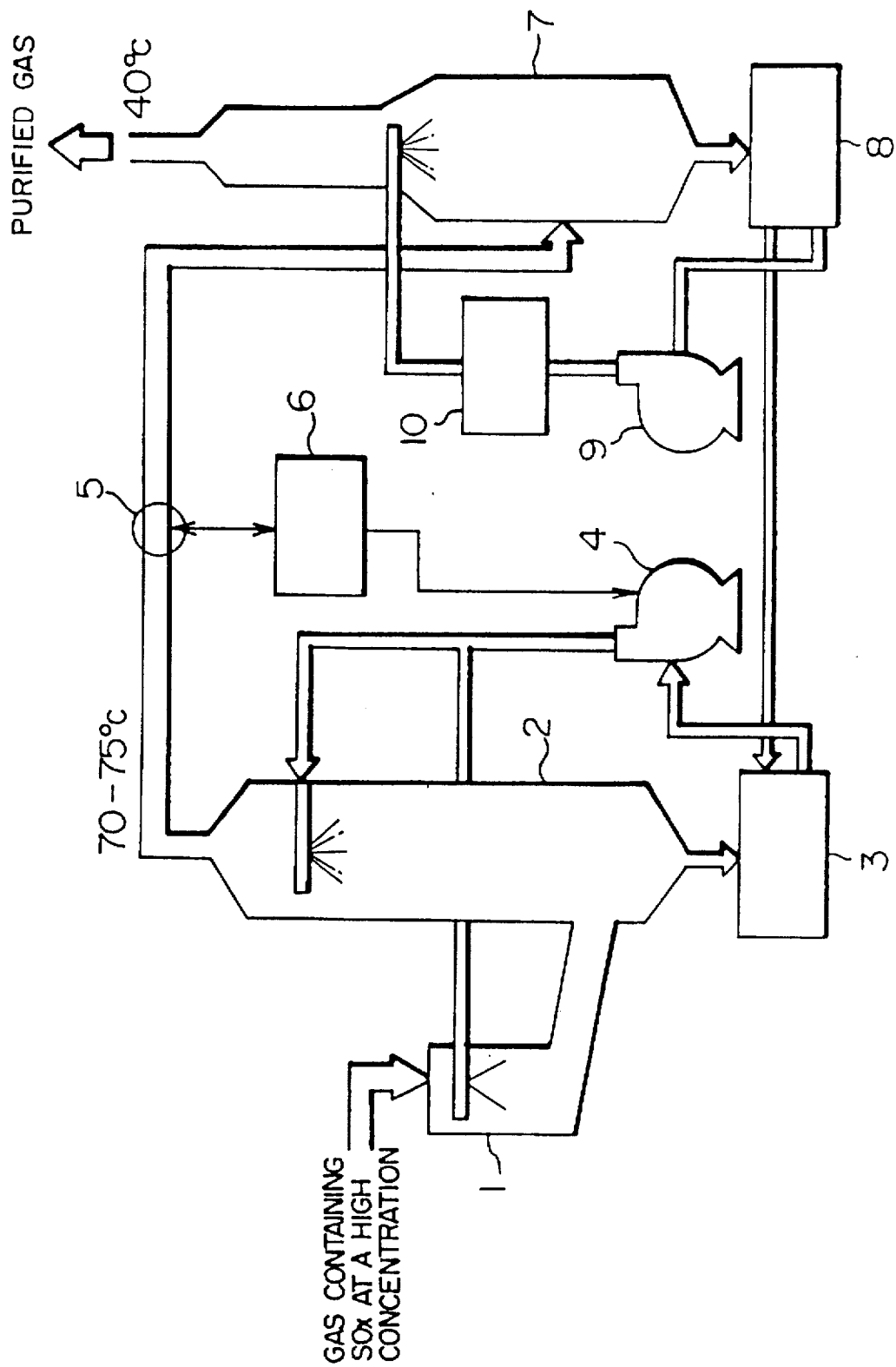
FIG. 2 is a process flow diagram on the basis of a series of two washing columns according to one embodiment of the present invention.

The present invention will be explained in detail below, referring Example of the present invention and FIG. 2.

EXAMPLE

A gas containing $SO_x$ at a high concentration obtained by contacting a flue gas with a carbonaceous adsorbent to remove $SO_x$ and $NO_x$ and regenerating the $SO_x$-adsorbed carbonaceous adsorbent with heating had the following composition:

$SO_2$ 18.9% by volume
$SO_3$ 3.5 ppm
HCl 1.0 g/Nm$^3$
HF 0.170 g/Nm$^3$
$NH_3$ 6 ppm
$O_2$ 0.9% by volume
$CO_2$ 25.4% by volume
$H_2O$ 42.4% by volume The gas at 214° C. was led to a quench column 1, quenched to 78° C. with water sprayed into the quench column 1, and led to the lower zone of a first washing column 2. Recirculating water was sprayed into the upper zone of the first washing column 2 from a first recirculating water tank 3 by a first recirculation pump 4, and the gas was further cooled to remove halides such as HCl, HF, etc. and ammonia by washing with the recirculating water.

In the present invention cooling of the gas in the first washing column 2 must be carried out so that the gas can have a maximum water content, while avoiding supercooling. Thus, the outlet temperature of the gas from the first washing column 2 was made to be 70°–75° C. by setting a ratio of the recirculating water to the gas (L/G) to 5–10 l/Nm$^3$ and the temperature of the recirculating water to 70°–75 C. Control of the outlet temperature of the gas from the first washing column 2 was carried out by detecting temperature by a temperature sensor 5 provided in the gas line between the first washing column 2 and a second washing column 7, and adjusting the rate of recirculating water to the first washing column 2 by a controller 6 interlocked with the temperature sensor 5 and the first recirculating pump 4.

The gas at 70°–75° C. from the first washing column was led into the lower zone of the second washing column. Recirculating water was sprayed into the upper zone of the second washing column 7 from a second recirculating water tank 8 by a second recirculation pump 9 after being cooled through a recirculating water cooler 10, whereby the gas was cooled and the halides such as HCl, HF, etc. and ammonia were removed by the washing.

In the second washing column 7, the gas was cooled down to 40° C., and thus condensed water was formed therein in an amount corresponding to a difference between a molar humidity at 70°–75° C. and that at 40° C., and it was not found necessary to supply fresh water to the recirculating water in the second washing column 7.

Purified gas from the second washing column 7 had the following composition. Halides and ammonia were completely removed from the gas.

$SO_2$ 18.9% by volume
$SO_3$ less than 1 ppm
HCl 0.001 g/Nm$^3$ (percent removal: 99.9%)
HF 0.006 g/Nm$^3$ (percent removal: 96.5%)
$NH_3$ less than 1 ppm (percent removals: 83.3%)

$O_2$ 0.7% by volume $CO_2$ 25.5% by volume $H_2O$ 8.7% by volume

As described above, impurities such as halides and ammonia could be efficiently removed from a gas containing $SO_x$ at a high concentration without any substantial addition of fresh water by controlling the outlet temperatures of the gas from the first washing column and the second washing column to specific temperatures respectively.

What is claimed is:

1. A process for purifying a gas containing sulfur dioxide and impurities comprising sulfur trioxide, ammonia and halogen compounds which comprises:

feeding a feed gas containing sulfur dioxide and impurities comprising sulfur trioxide, ammonia and halogen compounds to a first water washing column;

feeding first water to said first water washing column into effective contact with said feed gas under conditions sufficient to cool said feed gas and to wash halides and ammonia from said feed gas to form a first gaseous effluent comprising water and washed feed gas;

causing said first gaseous effluent to be at a temperature sufficient to maximize the water content thereof, and avoiding supercooling of said first gaseous effluent;

forming a first water effluent, comprising water and said washed out halides and ammonia, from said first water washing column;

without substantially cooling said first water effluent, recycling water from said first water effluent as a portion of said first water;

feeding said first gaseous effluent to a second water washing column;

feeding second water, which is at a lower temperature than said first water, to said second water washing column into effective contact with said first gaseous effluent under conditions sufficient to cool said first gaseous effluent, to thereby condense water from said first gaseous effluent, to wash halides and ammonia from said first gaseous effluent, and to thereby form a second gaseous effluent comprising sulfur dioxide and less of said impurities, and a second water effluent comprising water and said washed out impurities;

passing said second gaseous effluent out of said second water washing column;

passing said second water effluent out of said second water washing column;

cooling said second water effluent;

recycling a portion of said cooled second water effluent to said first water such that said first water consists essentially of first water effluent and second water effluent;

recycling the remainder of said cooled second water effluent to said second water washing column such that said second water consists essentially of second water effluent; and adding substantially no fresh water to the process.

2. A process as claimed in claim 1 further including:

operating said first washing column under such conditions that the temperature of said first gaseous effluent is about 70° to 75° C.; and operating said second washing column and said cooling under such conditions that the operating temperature of said second column is at least 20° C. cooler than the effluent temperature of the first gaseous effluent.

3. A process as claimed in claim 1 further comprising separately pumping said first and said second waters to said first and said second columns, respectively.

4. A process as claimed in claim 1 further including:

operating said first water washing column under such conditions that said first effluent gas is at a temperature of about 65° to 85° C.; and operating said second water washing column at a temperature of not higher than about 50° C., but at least 20° C. lower than the temperature of said first gaseous effluent.

5. A process as claimed in claim 4 including:

absorbing at least some of said impurities out of the feed gas into said sprayed first water in said first water washing column; and separating at least some of said absorbed impurities from said first water effluent.

6. A process as claimed in claim 1 including:

precipitating water from said first gaseous effluent in said second water washing column;

recovering said second water effluent from a lower portion of said second water washing column into a reservoir, and spraying at least some of said second water effluent into an upper portion of said second water washing column; and absorbing at least a portion of said impurities in said sprayed water in said second water washing column.

7. A process as claimed in claim 6 including recycling water from said a reservoir to a reservoir containing water recovered from a lower portion of said first washing column.

8. A process as claimed in claim 1 further comprising:

passing said second gaseous effluent laden in sulfur dioxide into effective adsorbing contact with a carbon adsorbent;

adsorbing sulfur dioxide onto said carbon;

desorbing sulfur dioxide from said carbon adsorbent to form a desorbed gas;

quenching said desorbed gas to form a quenched gas; and then using said quenched gas as the feed gas to said first water washing column.

9. A process as claimed in claim 1 wherein the concentration of sulfur dioxide in said feed gas is 18.9% by volume.

10. A process as claimed in claim 1 including:

recovering water from a lower portion of said first washing column into a first reservoir, and spraying at least some of said recovered water into an upper portion of said first washing column into effective contact with said feed gas containing impurities;

absorbing at least a portion of said first water by said feed gas; and carrying said absorbed water out of said first water washing column as part of said first effluent gas.

\* \* \* \* \*